United States Patent

Nakamura et al.

[11] Patent Number: 5,953,326
[45] Date of Patent: Sep. 14, 1999

[54] CELL SELECTION SCHEME IN CDMA MOBILE COMMUNICATION SYSTEM USING SPREAD CODES AND SPREAD CODE PHASES

[75] Inventors: Takehiro Nakamura, Yokosukashi; Kouji Ohno, Yokohamashi; Etsuhiro Nakano, Yokosukashi; Seizo Onoe, Yokohamashi, all of Japan

[73] Assignee: NTT Mobile Communications Network Inc., Tokyo, Japan

[21] Appl. No.: 08/812,693

[22] Filed: Mar. 6, 1997

[30] Foreign Application Priority Data

| Mar. 6, 1996 | [JP] | Japan | 8-049223 |
| Jul. 24, 1996 | [JP] | Japan | 8-194865 |

[51] Int. Cl.[6] .............. H04J 13/02; H04Q 7/36
[52] U.S. Cl. ............ 370/335; 370/342; 370/491
[58] Field of Search .................. 370/327, 335, 370/342, 491; 375/208, 209, 210; 455/446–449

[56] References Cited

U.S. PATENT DOCUMENTS

| 5,103,459 | 4/1992 | Gilhousen et al. |
| 5,691,974 | 11/1997 | Zehavi et al. ............ 370/203 |
| 5,703,873 | 12/1997 | Ojanpera et al. ............ 370/332 |
| 5,715,236 | 2/1998 | Gilhousen et al. ............ 370/209 |

*Primary Examiner*—Melvin Marcelo
*Attorney, Agent, or Firm*—Oblon, Spivak McClelland, Maier & Neustadt, P.C.

[57] ABSTRACT

A cell selection scheme in a CDMA mobile communication system which is capable of shortening the cell selection processing time while constructing a mobile communication system with a practically feasible base station configuration. In a CDMA mobile communication system, first type base stations which share a common reference timing are transmitting pilot channels spread by using an identical pilot channel spread code at mutually different spread code phases with respect to the common reference timing where these mutually different spread code phases are assigned to different first type base stations, and second type base stations which do not share the common reference timing are transmitting pilot channels spread by using mutually different pilot channel spread codes at arbitrary spread code phases where these mutually different pilot channel spread codes being assigned to different second type base stations. A mobile station receives these pilot channels and judges a located cell of the mobile station according to receiving levels, pilot channel spread codes and spread code phases of received pilot channels.

24 Claims, 15 Drawing Sheets

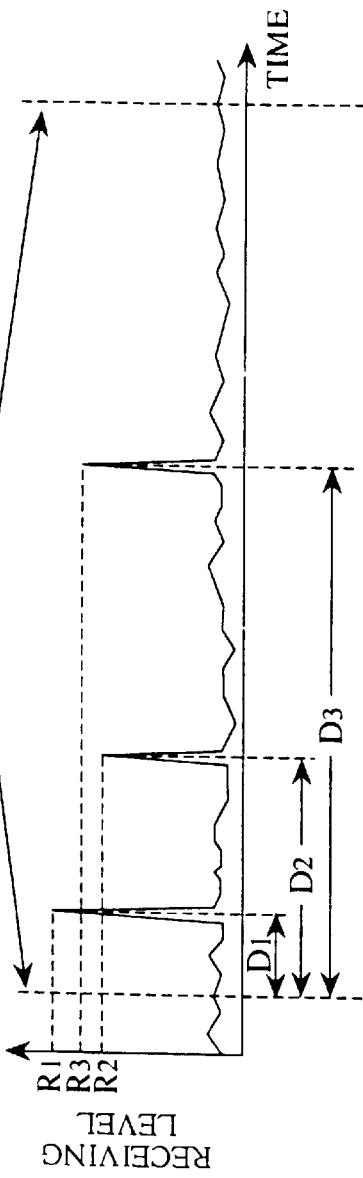
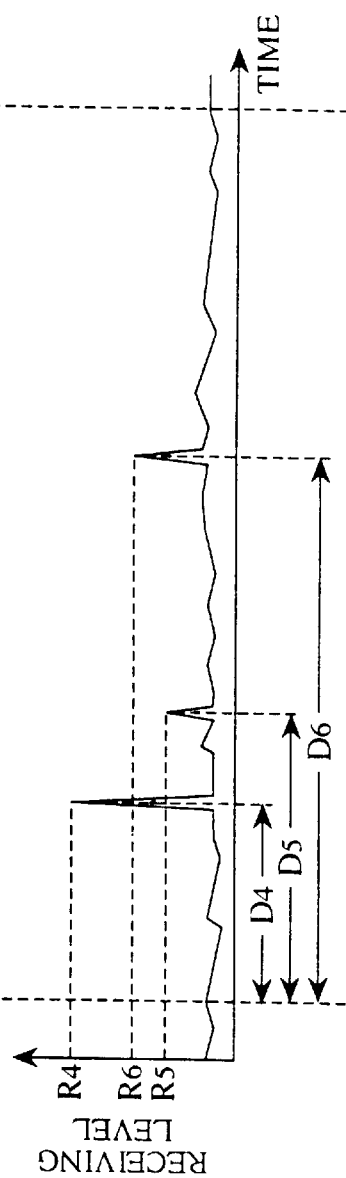
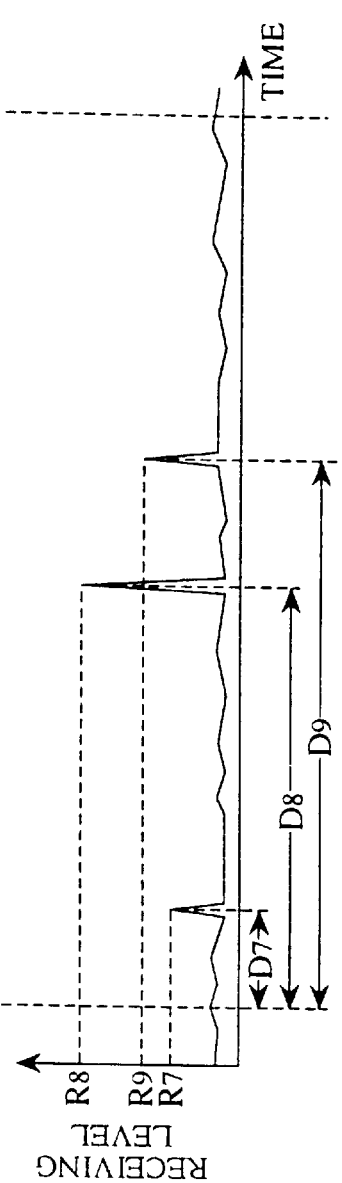
FIG. 9A SPREAD CODE SD1 (IDENTICAL SPREAD CODE)
FIG. 9B SPREAD CODE SD2 (DIFFERENT SPREAD CODE)
FIG. 9C SPREAD CODE SD3 (DIFFERENT SPREAD CODE)

FIG. 10

| SPREAD CODE NUMBER | SPREAD CODE PHASE DIFFERENCE | RECEIVING LEVEL |
|---|---|---|
| 1 | D1 | R1 |
| | D2 | R2 |
| | D3 | R3 |
| 2 | D4 | R4 |
| 3 | D8 | R8 |

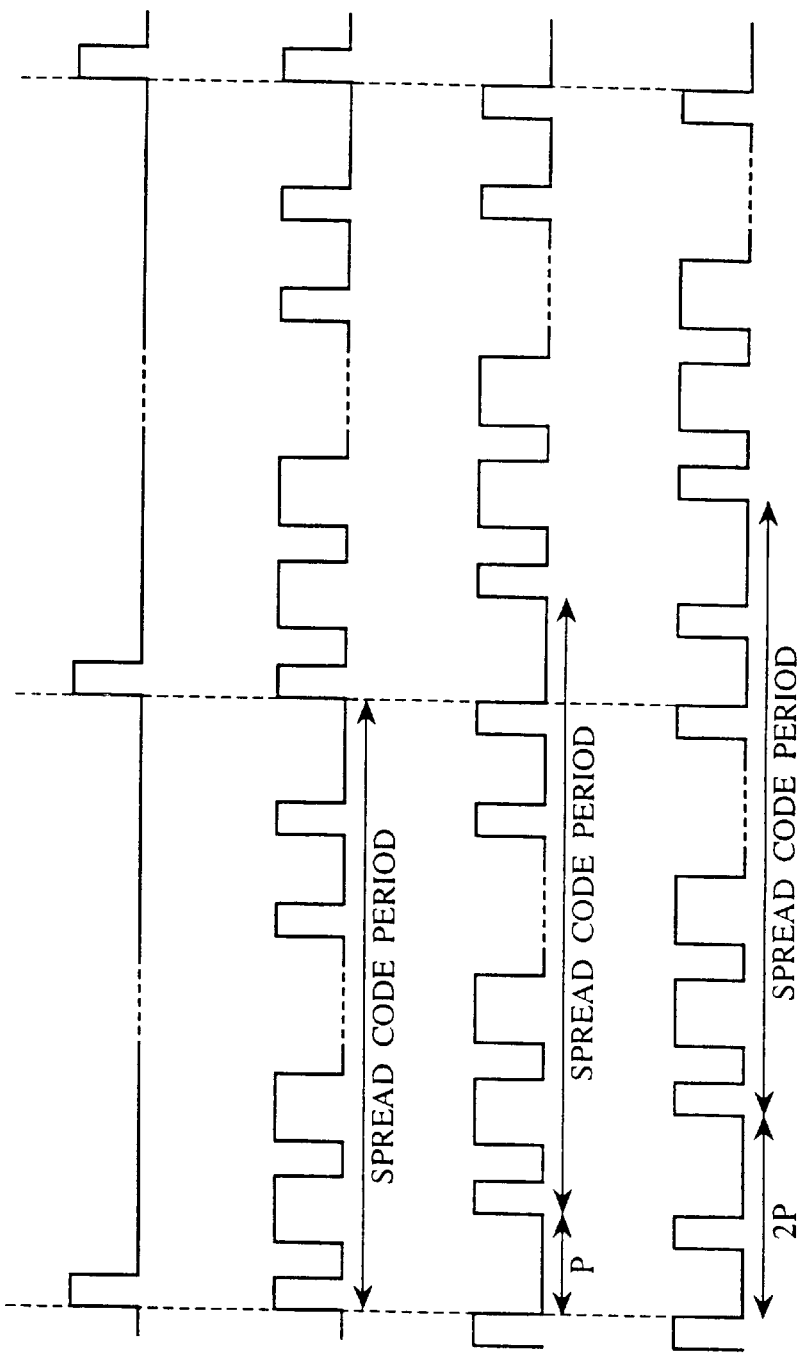

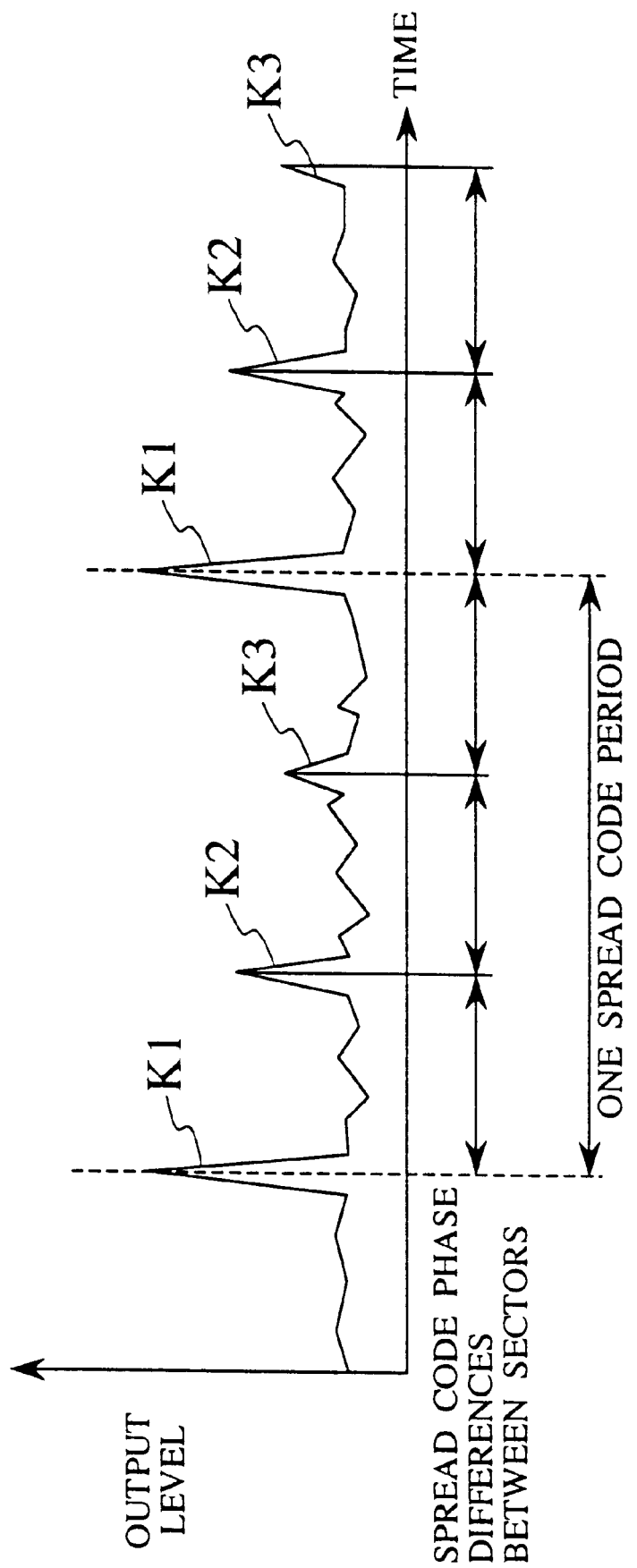

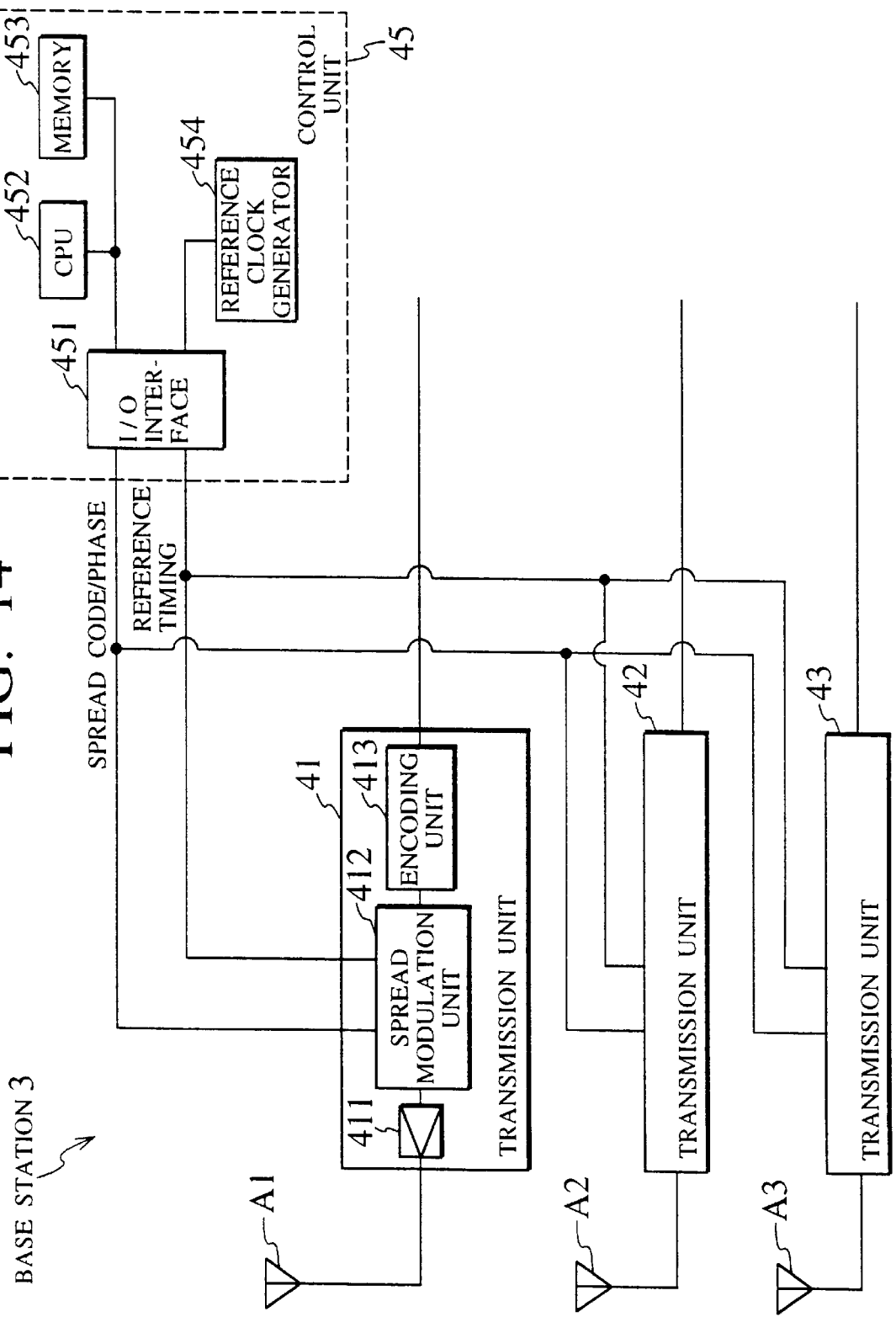

CELL SELECTION SCHEME IN CDMA MOBILE COMMUNICATION SYSTEM USING SPREAD CODES AND SPREAD CODE PHASES

BACKGROUND OF THE INVENTION

1. Field of the Invention

The present invention relates to a cell selection scheme in a CDMA (Code Division Multiple Access) mobile communication system and a base station device and a mobile station device suitable for a cell selection scheme.

2. Description of the Background Art

In the CDMA mobile communication scheme, a service area is divided into a plurality of unit regions called cells and one base station is provided in each cell so that a mobile station located in one cell within the service area carries out communications with the base station provided in that cell through radio channels.

Each base station is constantly transmitting a pilot channel, and the individual pilot channel is identifiable in some way when the pilot channel is received at the mobile station. For example, in the FDMA system, different frequencies are used for different pilot channels. In the CDMA system, the individual pilot channel becomes identifiable for the mobile station by using different spread codes for different pilot channels.

The mobile station measures receiving levels of a plurality of pilot channels, and makes the cell selection according to the measured values. More specifically, the mobile station despreads the received signals using a plurality of spread codes that can be used for the pilot channels, measures the receiving levels, and stores the measured values and the corresponding spread codes. After the measurement for all the spread codes is finished, the despreading and receiving processing is carried out for a pilot channel corresponding to the spread code for which the receiving level is largest, and the validity of the communication is judged by checking whether that pilot channel can be decoded without an error, whether the communication within that cell is permitted or not according to the decoded information, etc. When it is judged as valid, this cell is set as a located cell. If it is not valid, the receiving processing for a next pilot channel in an order of the receiving levels is carried out and the validity of the communication is judged similarly, until a valid cell is set as a located cell.

A time required for the pilot channel receiving level measurement processing in the above described cell selection processing is as much as multiple times of the spread code period per one pilot channel measurement, for the following reasons.

As an illustrative example, a case of using a matched filter for the pilot channel receiving level measurement processing will be described. FIG. 1 shows an exemplary output of the matched filter when a signal spread by a spread code is entered. As shown in FIG. 1, a peak signal is outputted at an interval of one spread code period, and an output level of this peak signal is taken as the receiving level. In the actual receiving level measurement processing, in order to improve the measurement accuracy, the output levels are measured over several periods at a timing of the peak signal detected in the first spread code period and an average value of these measured output levels is taken as the measured value of the receiving level. Consequently, the receiving level measurement for one spread code is going to require as much time as multiple times of the spread code period.

The above description is an exemplary case of using the matched filter, but the matched filter has a serious drawback in that the hardware size is relatively large and the power consumption is large, so that a sliding correlator which is more advantageous in terms of the hardware size and the power consumption is often used in practice. However, in a case of using the sliding correlator, the processing time is as much as the processing time of the matched filter multiplied by the spread code period, so that even longer processing time is going to be required.

In addition, this much of the processing time is required as many times as a number of spread codes that can be used as the pilot channels, so that the cell selection processing is going to be require a rather long time. This implies that a long time will be required after the power of the mobile station is turned on until the mobile station becomes operable, for instance.

As a scheme for resolving this problem, there is a scheme in which the pilot channels are made identifiable by assigning mutually different spread code phases to different pilot channels. FIG. 2 shows an exemplary output of the matched filter used for the pilot channel receiving level measurement processing in a case of using an identical spread code and different spread code phases for different pilot channels. In this example, the spread code phases of three pilot channels are sequentially displaced by ⅓ of the spread code period. As shown in FIG. 2, peaks corresponding to these three pilot channels appear at an interval of the spread code phase difference between two pilot channels, and a peak corresponding to one pilot channel appears at an interval of the spread code period similarly as in a case of FIG. 1.

In this scheme, peaks corresponding to a plurality of pilot channels can be detected by the measurement for a single spread code, so that the receiving levels of a plurality of pilot channels can be obtained by measuring each of these peaks. In this manner, by assigning N sets of mutually different spread code phases for a single spread code with respect to N sets of pilot channels, the receiving level measurement can be carried out in a time as short as 1/N of that required in a case of identifying the pilot channels using mutually different spread codes.

Here, in order to use these mutually different spread code phases assigned to a plurality of pilot channels, it is necessary for all of the base stations to share a common reference timing, so that a spread code phase difference for each pilot channel can be set up with respect to this reference timing. This is because, if the pilot channel is transmitted at an arbitrary spread code phase by each base station, there is a possibility for a plurality of pilot channels to be transmitted at nearly identical spread code phases. In such a case, the mobile station would not be able to identify these plurality of pilot channels which are transmitted at nearly identical spread code phases, so that it would becomes impossible to carry out the cell selection using these pilot channels.

FIG. 3 shows a timing chart in a case of assigning mutually different spread code phase differences with respect to the reference timing to three pilot channels. As shown in FIG. 3, by using the common reference timing for all the base stations and assigning the spread code phase difference with respect to this reference timing to each the pilot channel, it is possible to realize the mutually different spread code phases for different pilot channels.

However, in order to share the common reference timing among a plurality of base stations, it is necessary to provide a very complicated timing synchronization means. Up to the present, a scheme for carrying out radio or wire communications among the base stations to measure the round trip delay and a scheme for utilizing GPS (Global Positioning System) have been proposed and practiced in some cases, but there has been an associated difficulty concerning the complicated hardware configuration.

In particular, in conjunction with a future development of the mobile communication service, it is expected that greater degrees of freedom in the base station installment as well as a smaller size of the base station will be demanded. Consequently, it is not feasible to provide a function for sharing the common reference timing in every base station from a point of view of the required hardware configuration, and it is expected that this function can be provided in only a limited number of base stations.

Thus, in the scheme using different spread codes for different pilot channels, there has been a problem of a long processing time required for the cell selection processing. In contrast, in the scheme using different spread code phases for different pilot channels, the processing time required for the cell selection processing can be shortened but there is a need for all the base stations to share the common reference timing, and there has been a problem that a complicated hardware configuration required in providing this function at every base station makes this scheme difficult to practice.

On the other hand, in the mobile communication system, one cell is often subdivided into a plurality of sectors in order to increase the radio channel capacity using an increased number of sectors per one cell. For example, FIG. 4 shows a cell C1 which is subdivided into three sectors: the first sector S1, the second sector S2 and the third sector S3.

In a case of using such sectors, there is a need for a located sector judgement processing in order to judge a sector in which the mobile station is currently located. To this end, it is necessary to provide different pilot channels for different sectors.

However, when different pilot channels are provided for different sectors and different spread codes are assigned to different pilot channels in order to carry out the located sector judgement processing, there arises a problem that a required number of spread codes for the pilot channels in the system increases as a number of sectors per one cell increases.

The mobile station realizes the activation at a time of power on by sequentially carrying out the receiving level measurement processing for the pilot channels corresponding to all the spread codes stored in the mobile station, and when a number of spread codes for the pilot channels increases in conjunction with the use of sectors as described above, it becomes necessary for the mobile station to carry out the receiving level measurement processing for all of these increased number of spread codes. Since this receiving level measurement processing requires a time as much as multiple times of the spread code period, when a number of spread codes is increased, there arises a problem that an activation time of the mobile station becomes even longer.

SUMMARY OF THE INVENTION

It is therefore an object of the present invention to provide a cell selection scheme in a CDMA mobile communication system which is capable of shortening the cell selection processing time while constructing a mobile communication system with a practically feasible base station configuration.

It is another object of the present invention to provide a cell selection scheme in a CDMA mobile communication system which is capable of realizing the located cell/sector judgement quickly and accurately, without increasing a number of spread codes for the pilot channels required for the purpose of the located sector judgement and an activation time of the mobile station.

According to one aspect of the present invention there is provided a method for judging a located cell of a mobile station in a CDMA mobile communication system in which a base station is provided at each of a plurality of cells, comprising the steps of: transmitting from a plurality of first type base stations which share a common reference timing, pilot channels spread by using an identical pilot channel spread code at mutually different spread code phases with respect to the common reference timing, said mutually different spread code phases being assigned to different first type base stations; transmitting from a plurality of second type base stations which do not share the common reference timing, pilot channels spread by using mutually different pilot channel spread codes at arbitrary spread code phases, said mutually different pilot channel spread codes being assigned to different second type base stations, and receiving the pilot channels transmitted from the first and second type base stations at a mobile station, and judging a located cell of the mobile station according to receiving levels, pilot channel spread codes and spread code phases of received pilot channels.

According to another aspect of the present invention there is provided a CDMA mobile communication system in which a base station is provided at each of a plurality of cells, comprising: a plurality of first type base stations which share a common reference timing, for transmitting pilot channels spread by using an identical pilot channel spread code at mutually different spread code phases with respect to the common reference timing, said mutually different spread code phases being assigned to different first type base stations; a plurality of second type base stations which do not share the common reference timing, for transmitting pilot channels spread by using mutually different pilot channel spread codes at arbitrary spread code phases, said mutually different pilot channel spread codes being assigned to different second type base stations; and a mobile station for receiving the pilot channels transmitted from the first and second type base stations, and judging a located cell of the mobile station according to receiving levels, pilot channel spread codes and spread code phases of received pilot channels.

According to another aspect of the present invention there is provided a base station apparatus for use in a CDMA mobile communication system in which a base station is provided at each of a plurality of cells, and a located cell of a mobile station is judged according to a pilot channel transmitted by each base station, the base station apparatus comprising: a timing device for sharing a common reference timing among a group of base stations which are to transmit pilot channels using an identical pilot channel spread code at mutually different spread code phases with respect to the common reference timing, said mutually different spread code phases being assigned to different base stations of the group; and a transmission device for transmitting a pilot channel spread by using the identical pilot channel spread code at one of said mutually different spread code phases assigned to the base station apparatus with respect to the common reference timing.

According to another aspect of the present invention there is provided a mobile station apparatus for use in a CDMA mobile communication system in which a base station is provided at each of a plurality of cells, the base stations includes a plurality of first type base stations and a plurality of second type base stations, the first type base stations being sharing a common reference timing and transmitting pilot channels spread by using an identical pilot channel spread code at mutually different spread code phases with respect to the common reference timing where said mutually different spread code phases are assigned to different first type base stations, the second type base stations being not sharing the common reference timing and transmitting pilot channels spread by using mutually different pilot channel spread codes at arbitrary spread code phases where said mutually different pilot channel spread codes are assigned to different second type base stations, and a located cell of a mobile station is judged according to a pilot channel transmitted by each base station, the mobile station apparatus comprising: a receiving device for receiving pilot channels transmitted from the first and second type base stations; and a judgement device for judging a located cell of the mobile station according to receiving levels, pilot channel spread codes and spread code phases of received pilot channels.

According to another aspect of the present invention there is provided a base station apparatus for use as a base station provided in one cell which is subdivided into a plurality of sectors in a CDMA mobile communication system in which a base station is provided at each of a plurality of cells, and a located cell/sector of a mobile station is judged according to a pilot channel transmitted by each base station, the base station apparatus comprising: a timing device for generating a reference timing; and a transmission device for transmitting pilot channels for the sectors spread by using a pilot channel spread code assigned to the base station apparatus at mutually different spread code phase differences with respect to the reference timing, said mutually different spread code phase differences being assigned to different sectors.

According to another aspect of the present invention there is provided a mobile station apparatus for use in a CDMA mobile communication system in which a base station is provided at each of a plurality of cells, a located cell/sector of a mobile station is judged according to a pilot channel transmitted by each base station, at least one cell is subdivided into a plurality of sectors, and one base station provided at said at least one cell is transmitting pilot channels for the sectors spread by using a pilot channel spread code assigned to said one base station with mutually different spread code phase differences with respect to a reference timing, said mutually different spread code phase differences being assigned to different sectors, the mobile station apparatus comprising: a receiving device for receiving pilot channels transmitted from base stations including the pilot channels for sectors transmitted from said one base station; and a judgement device for judging a located cell/sector of the mobile station according to receiving levels, pilot channel spread codes and spread code phases of received pilot channels.

Other features and advantages of the present invention will become apparent from the following description taken in conjunction with the accompanying drawings.

BRIEF DESCRIPTION OF THE DRAWINGS

FIG. 9 is an illustration of exemplary matched filter outputs for three different pilot channel spread codes in the second embodiment of the present invention.

FIG. 10 is an illustration of an exemplary table stored in a memory of the mobile station in the second embodiment of the present invention.

FIG. 12 is a timing chart showing exemplary pilot channel spread code phase relationship in the fifth embodiment of the present invention.

FIG. 13 is an illustration of an exemplary matched filter output in the fifth embodiment of the present invention.

FIG. 14 is a block diagram of a cell/sector selection related section of a base station according to the fifth embodiment of the present invention.

DETAILED DESCRIPTION OF THE PREFERRED EMBODIMENTS

Referring now to FIG. 5 to FIG. 8, the first embodiment of the cell selection scheme in the CDMA mobile communication system according to the present invention will be described in detail.

Figure 5:
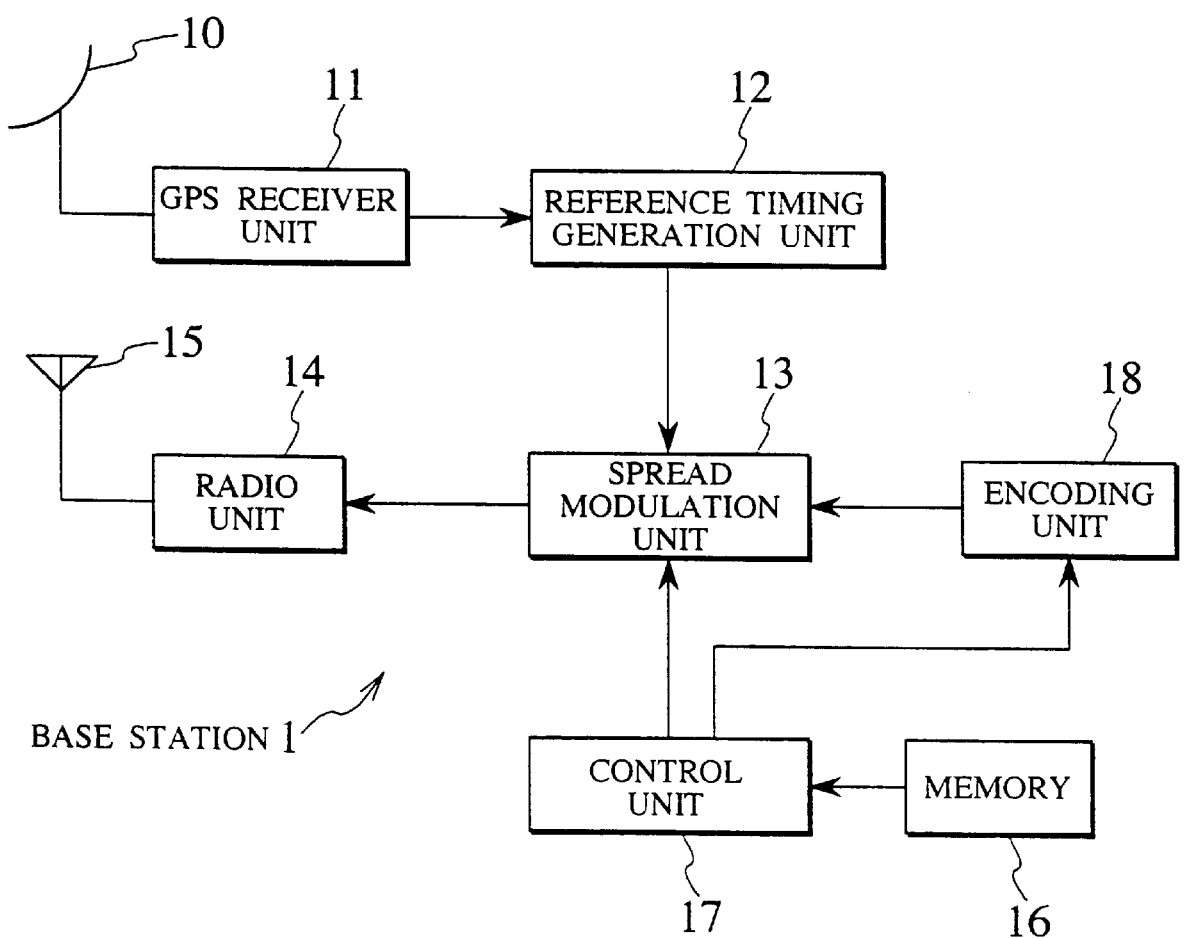
FIG. 5 is a block diagram of a cell selection related section of a base station according to the first embodiment of the present invention.

FIG. 5 shows a configuration of a base station device in the CDMA mobile communication system according to the first embodiment. This base station device 1 of FIG. 5 comprises a GPS antenna 10, a GPS receiver unit 11 connected with the GPS antenna 10, a reference timing generation unit 12 connected with the GPS receiver unit 11, a spread modulation unit 13 connected with the reference timing generation unit 12, a radio unit 14 connected with the spread modulation unit 13, an antenna 15 connected with the radio unit 14, an encoding unit 18 connected with the spread modulation unit 13, a control unit 17 connected with the spread modulation unit 13 and the encoding unit 18, and a memory 16 connected with the control unit; 17.

The GPS receiver unit 11 carries out a receiving processing for a GPS signal received from the GPS antenna 10, and the reference timing generation unit 12 generates a reference timing to be used in the base station according to the received GPS signal.

The spread modulation unit 13 generates a pilot channel according to an encoded control signal supplied from the encoding unit 18, using the reference timing generated by the reference timing generation unit 12 and the spread code and the spread code phase specified from the control unit 17.

The radio unit 14 carries out the amplification, etc. of the pilot channel generated by the spread modulation unit 13, and the antenna 15 transmits the pilot channel.

The memory 16 stores a pilot channel spread code and a spread code phase difference value with respect to the reference timing which are to be used in the base station.

The control unit 17 carries out the overall control of the base station, and the encoding unit 18 encodes a control signal generated by the control unit 17 which is to be transmitted by the pilot channel.

The CDMA mobile communication system in this first embodiment incorporates two types of base stations including first type base stations which share the common reference timing among a plurality of base stations, and second type base stations which do not share the common reference timing. Each first type base station has a configuration of FIG. 5 described above, which has a function for generating the common reference timing using the GPS antenna 10 and the GPS receiver unit 11. Each second type base station has a configuration similar to that of FIG. 1 except that the GPS antenna 10 and the GPS receiver unit 11 are omitted.

Figure 1:
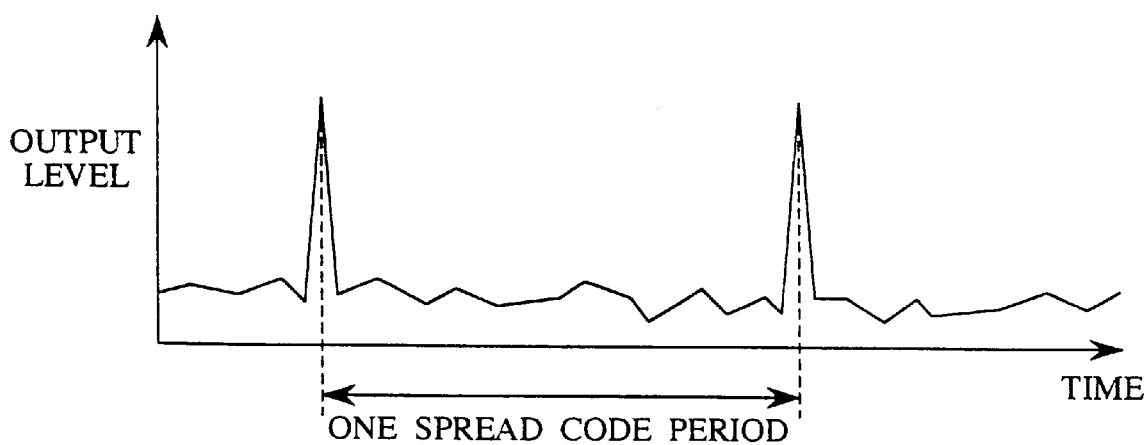
FIG. 1 is an illustration of one example of a matched filter output in a conventional CDMA mobile communication system.
Figure 2:
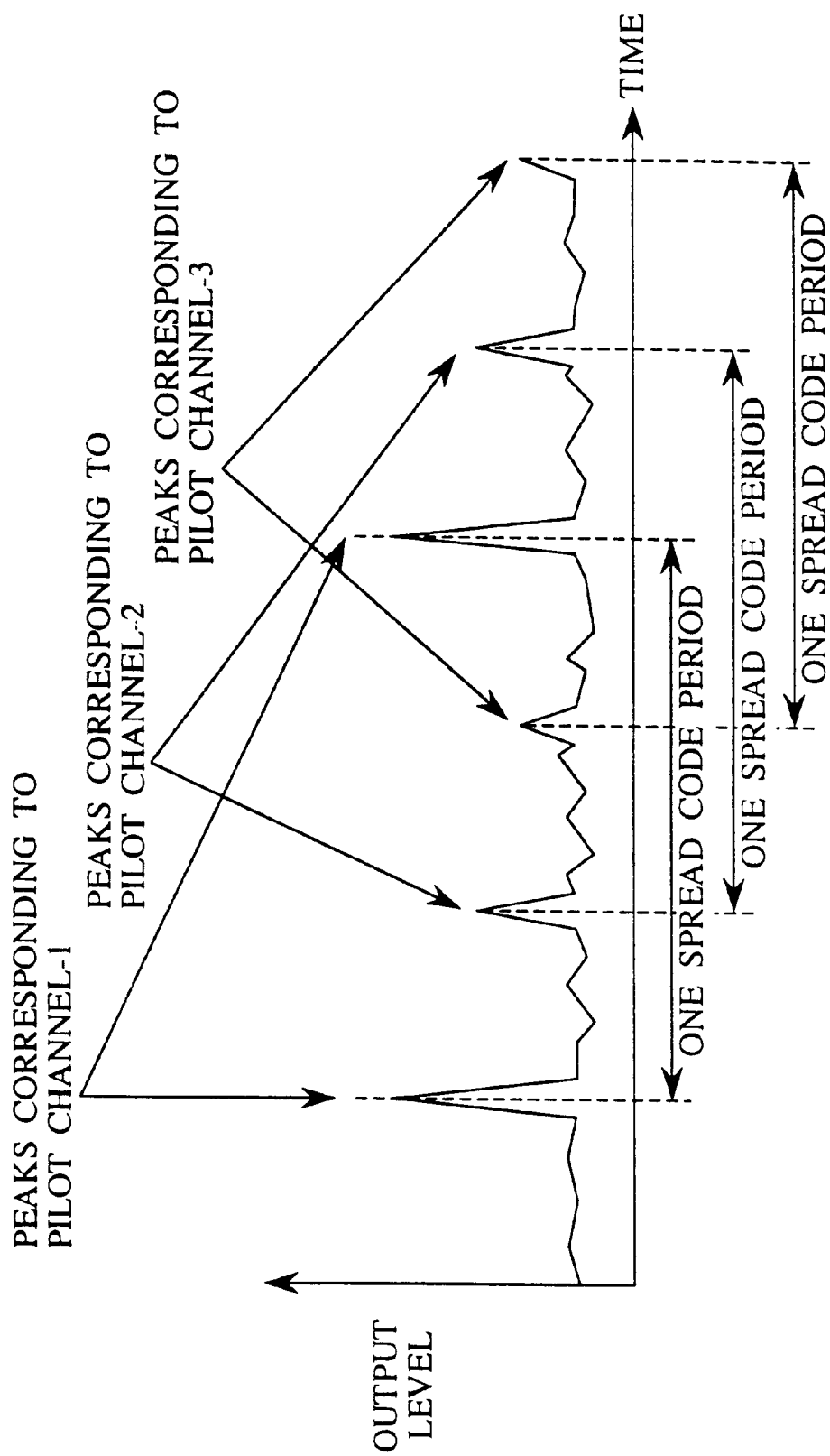
FIG. 2 is an illustration of another example of a matched filter output in a conventional CDMA mobile communication system.
Figure 3:
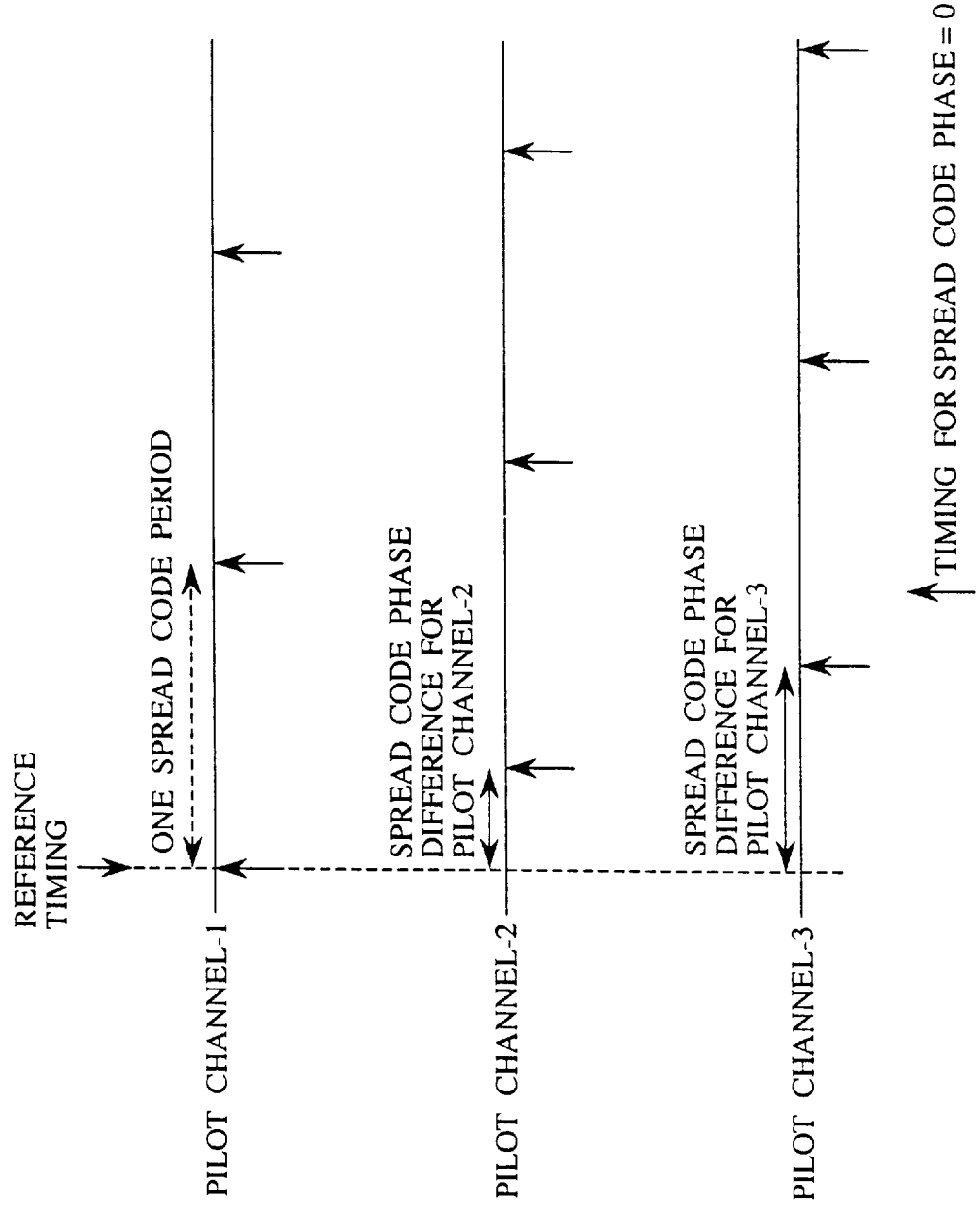
FIG. 3 is a timing chart showing an exemplary pilot channel spread code phase relationship in a conventional CDMA mobile communication system.

Note here that the configuration of FIG. 1 utilizes the GPS for the purpose of generating the common reference timing, but it is also possible to adopt any other configuration capable of generating the common reference timing. For example, it is also possible to use a round trip delay measurement device instead of the GPS antenna 10 and the GPS receiver unit 11.

Figure 6:
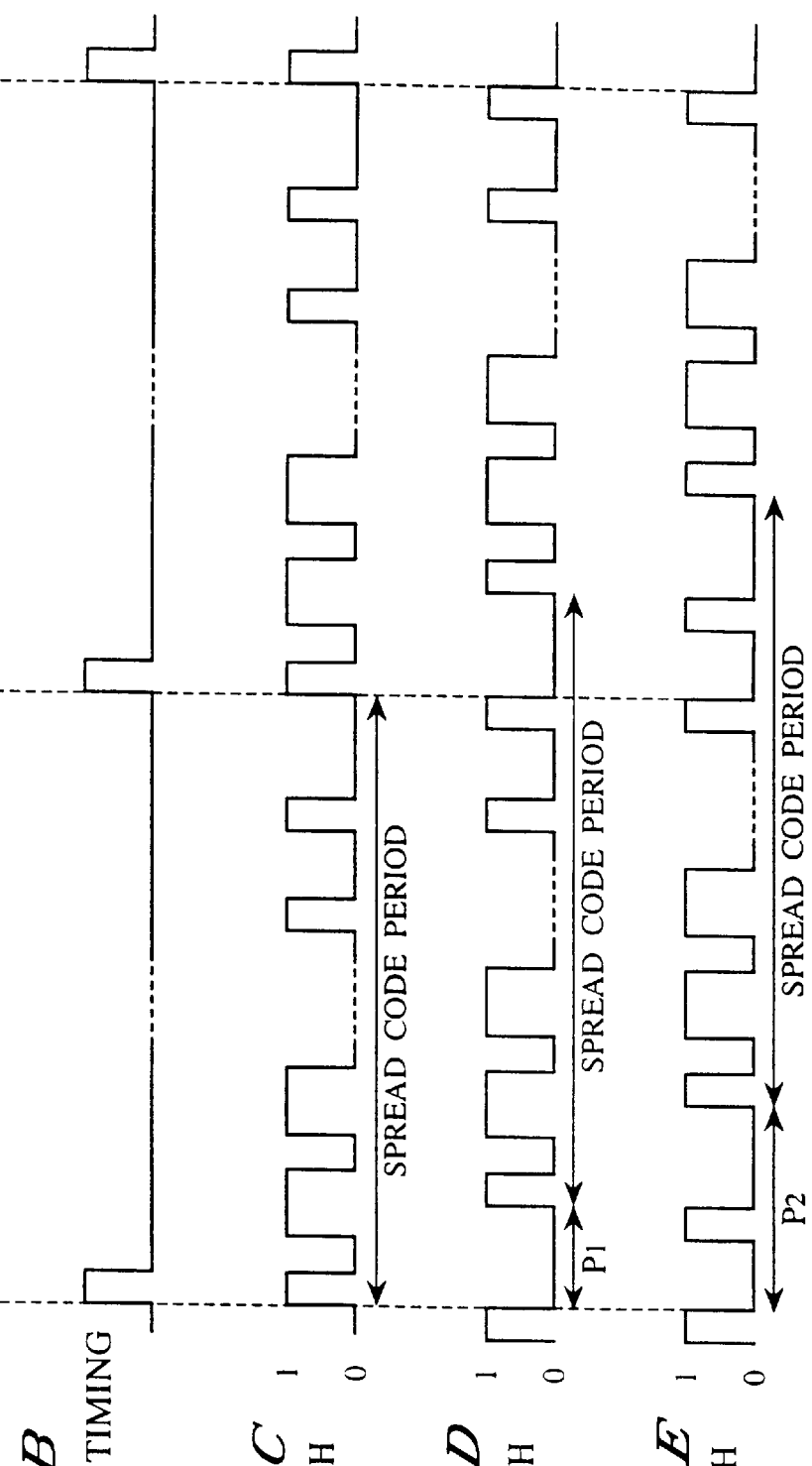
FIG. 6 is a timing chart showing exemplary pilot channel spread code phase relationship in the first embodiment of the present invention.

FIG. 6 shows a timing chart for a process of spreading the pilot channels at the base stations which share the common reference timing, where the GPS signal, the reference timing signal, and the spread codes for the pilot channels of three base stations are indicated in correspondence. Now, the scheme for transmitting the pilot channels in this first embodiment will be described with reference to FIG. 6.

The reference timing generation unit 12 generates the reference timing signal in a spread code period, which is obtained by multiplying b/a to the period of the GPS signal received by the GPS receiver unit 11. FIG. 6 shows an exemplary case of obtaining the reference timing signal by multiplying ½ to the GPS signal period. The reference timing signal generated by the reference timing generation unit 12 is then supplied to the spread modulation unit 13.

In addition, the control unit 17 of the base station reads out the pilot channel spread code and the spread code phase different value with respect to the reference timing from the memory 16, and notifies them to the spread modulation unit 13.

The spread modulation unit 13 then carries out the pilot channel spreading processing according to the notified spread code and spread code phase difference. Among the first type base stations which share the common reference timing, an identical spread code is stored in the memory 16 of every first type base station, while mutually different spread code phase differences with respect to the reference timing are stored in the memory 16 of different first type base stations. Consequently, the spread modulation unit 13 of different first type base stations carry out the spreading of the pilot channel using the identical spread code at different spread code phases as indicated in FIG. 6. In an example shown in FIG. 6, three base stations BS1, BS2 and BS3 use the mutually different spread code phase differences of 0, P1 and P2 with respect to the reference timing.

In the second type base station which does not share the common reference timing, the reference timing generation unit 12 generates an arbitrary reference timing signal in the spread code period, and supplies the generated reference timing signal to the spread modulation unit 13. Among the second type base stations which do not share the common reference timing, the pilot channels are to be distinguished by using different spread codes, without using the spread code phase. Consequently, in the second type base station, the memory 16 stores only the pilot channel spread code, and the control unit 17 supplies the pilot channel spread code read out from the memory 16 alone to the spread modulation unit 13. The spread modulation unit 13 then carries out the spreading of the pilot channel using the spread code specified from the control unit 17, at the phase difference equal to 0 with respect to the reference timing generated by the reference timing generation unit 12.

Next, the pilot channel receiving processing at the mobile station in this first embodiment will be described.

Figure 7:
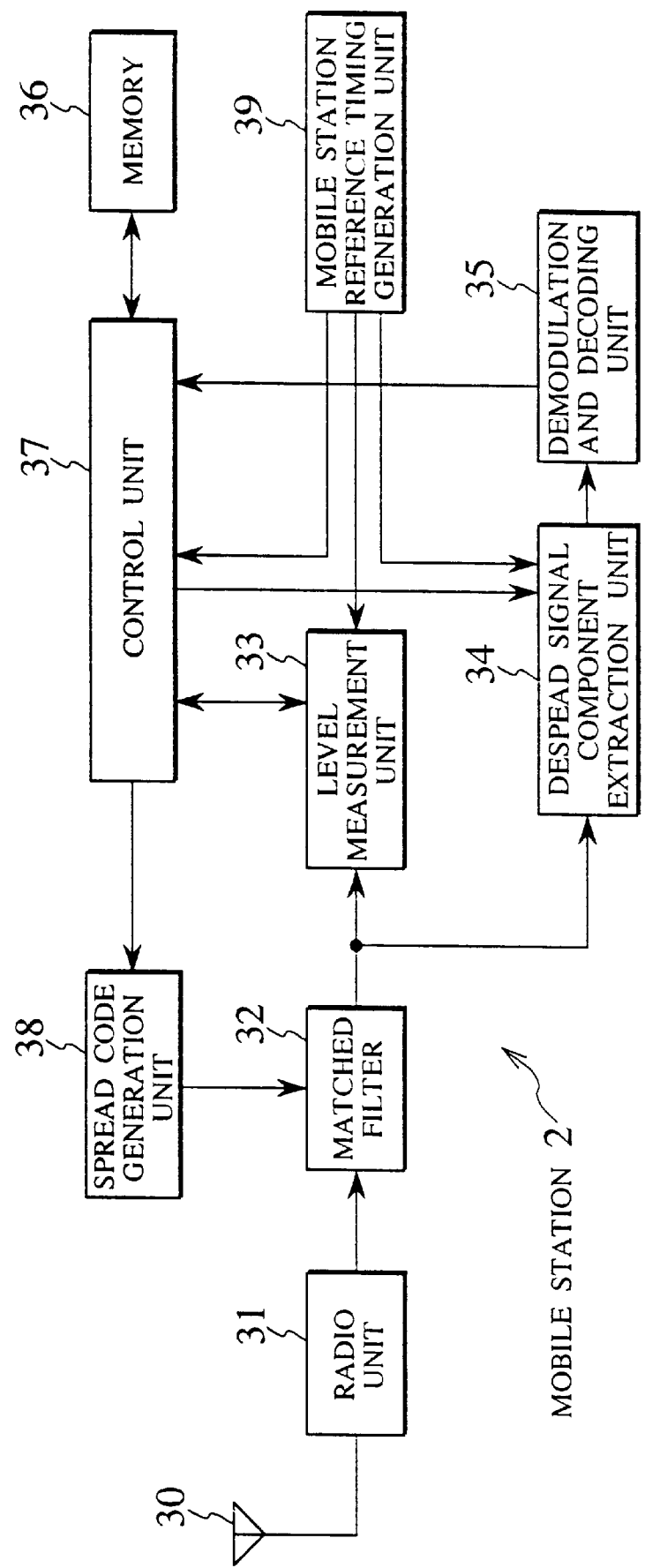
FIG. 7 is a block diagram of a cell selection related section of a mobile station according to the first embodiment of the present invention.

FIG. 7 shows a configuration of the mobile station device in the CDMA mobile communication system according to the first embodiment. This mobile station device 2 of FIG. 7 comprises an antenna 30, a radio unit 31 connected with the antenna 30, a matched filter 32 connected with the radio unit 31, a level measurement unit 33 connected with the matched filter 32, a despread signal component extraction unit 34 connected with the matched filter 32, a demodulation and decoding unit 35 connected with the despread signal component extraction unit 34, a spread code generation unit 38 connected with the matched filter 32, a control unit 37 connected with the spread code generation unit 38, the level measurement unit 33, the despread signal component extraction unit 34 and the modulation and decoding unit 35, a memory 36 connected with the control unit 37, and a mobile station reference timing generation unit 39 connected with the level measurement unit 33, the despread signal component extraction unit 34 and the control unit 37.

The radio unit 31 carries out the amplification, etc. of the signal received from the antenna 30, and the matched filter 32 despread the received signal by the pilot channel spread code and outputs the despread signal.

The level measurement unit 32 detects a peak in the despread signal outputted from the matched filter 32 and measures a phase difference of the peak with respect to the mobile station reference timing as well as a receiving level of the peak.

The despread signal component extraction unit 34 extracts a component of the despread signal corresponding to a phase difference specified by the control unit 37 with respect to the mobile station reference timing, and the modulation and decoding unit 34 carries out the demodulation and the decoding of the component extracted by the despread signal component extraction unit 34.

The memory 36 stores all the spread codes that can be used for the pilot channel and the receiving level measurement results for the pilot channels, and the control unit 37 carries out the overall control of the mobile station.

The spread code generation unit 38 generates the spread code specified by the control unit 37 and supplies the generated spread code to the matched filter 32, while the mobile station reference timing generation unit 39 generates the mobile station reference timing in the spread code period which is to be used in the mobile station.

In the mobile station, when the cell selection processing starts, the control unit 37 reads out one pilot channel spread code from the memory 36 and specifies the read out pilot channel spread code to the spread code generation unit 38. The spread code generation unit 38 then generates the specified spread code and supplies the generated spread code to the matched filter 32.

The matched filter 32 despreads the signal received through the antenna 30 and the radio unit 3,1 by the supplied spread code and outputs the despread signal.

The level measurement unit 33 detects a peak in the despread signal, measures a phase difference between the peak occurrence timing and the mobile station reference timing as well as a receiving level of the peak, and notifies the measurement results to the control unit 37. Here, as a method for detecting the peak, it suffices to use a method where an interval in which the receiving level continuously exceeds a prescribed threshold is detected and a timing at which the receiving level becomes largest within that interval is taken as the peak timing. Also, as a method for measuring the receiving level of the peak, it is possible to use a method in which the receiving levels at the identical peak timing in a plurality of spread code periods are averaged, and the obtained average value is notified to the control unit 37 as the measured receiving level value.

Figure 8:
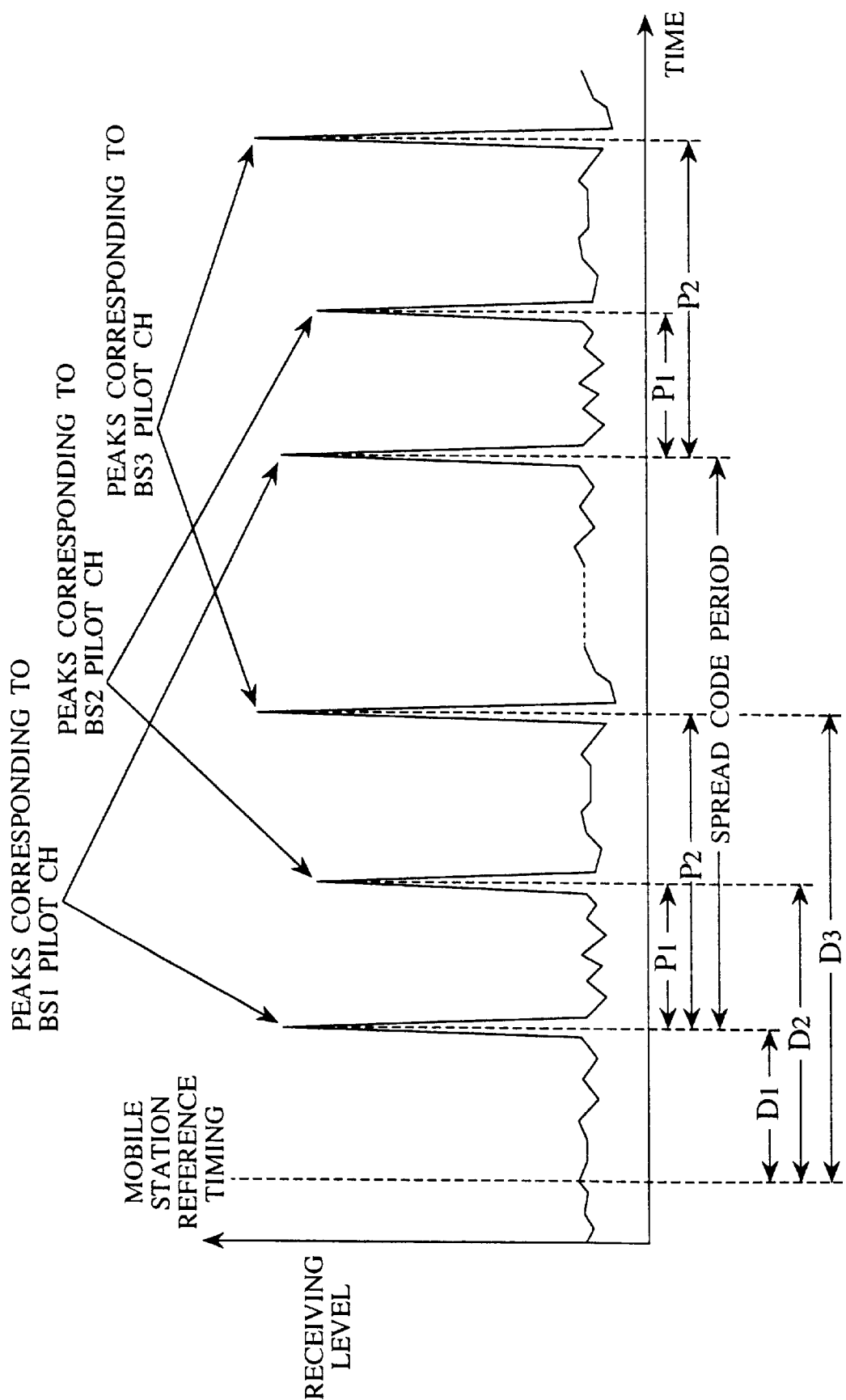
FIG. 8 is an illustration of an exemplary matched filter output in the first embodiment of the present invention.

FIG. 8 shows the despread signal outputted by the matched filter 32 in an exemplary case where the mobile station of FIG. 7 received the pilot channels from three base stations BS1, BS2 and BS3 which share the common reference timing as described in relation to FIG. 6. In this despread signal of FIG. 8, peaks corresponding to these three pilot channels sequentially appear at different phases corresponding to the spread code phase differences 0, P1 and P2 assigned to the base stations BS1, BS2 and BS3. In an exemplary case of FIG. 8, the phase difference between the peak timing and the mobile station reference timing as notified from the level measurement unit 33 to the control unit 37 is D1, D2 and D3 for the peaks corresponding to the pilot channels of the base stations BS1, BS2 and BS3, respectively.

Here, in practice, a distance between the mobile station and the base station is different for each base station and the radio wave propagation delay time is different for each base station, so that the phase differences among the peaks corresponding to the pilot channels of the base stations do not accurately coincide with the spread code phase differences assigned to the base stations. However, the spread code phase differences 0, P1 and P2 assigned to the base stations are not significant for the processing at the mobile station, and it suffices for the mobile station to carry out its processing according to the detected phase differences D1, D2 and D3 with respect to the mobile station reference timing.

The control unit 37 then stores the receiving level and the phase difference with respect to the mobile station reference timing of each peak notified from the level measurement unit 33 in the memory 36, in correspondence to the spread code.

Next, the control unit 37 reads out a next spread code that can be used as the pilot channel, carries out the same processing as described above, and stores the receiving level and the phase difference with respect to the mobile station reference timing of the peak for that spread code in the memory 36, in correspondence to that spread code. This operation is subsequently repeated for all the spread codes that can be used for the pilot channel.

After the measurement for all the pilot channel spread codes is finished, the control unit 37 selects the largest receiving level value among the measured receiving level values stored in the memory 36, and reads out the spread code and the phase difference with respect to the mobile station reference timing which are stored in correspondence to that largest receiving level value.

Then, the control unit 37 notifies the read out spread code to the spread code generation unit 38, and the spread code generation unit 38 generates the notified spread code and supplies the generated spread code to the matched filter 32. The matched filter 32 then despreads the received signal by the supplied spread code and outputs the despread signal.

In addition, the control unit 37 notifies the read out phase difference with respect to the mobile station reference timing to the despread signal component extraction unit 34, and the despread signal component extraction unit 34 extracts a component of the despread signal corresponding to the notified phase difference with respect to the mobile station reference timing, and outputs the extracted component to the demodulation and decoding unit 35. The demodulation and decoding unit 35 carries out the demodulation and the decoding of the extracted component, and supplies the decoded control signal to the control unit 37.

Then, according to the content of the decoded control signal, the control unit 37 judges the validity of the communication by checking whether there is any error in the control signal or not, whether the communication at the base station which transmitted this pilot channel is permitted or not, etc. When the control unit 37 judges that the communication is valid, ia cell supported by the base station which transmitted this pilot channel is determined as a located cell. If the control unit 37 judges that the communication is not valid because there is an error in the control signal, or the communication at the base station which transmitted this pilot channel is not permitted, etc., the similar processing for judging the validity of the communication is carried out for the next pilot channel which has the next largest receiving level among those stored in the memory 36. This operation is repeated if necessary and the cell selection processing is finished when the validity of the communication is confirmed and a located cell is determined.

As described, in this first embodiment, the CDMA mobile communication system mixedly incorporates the first type base stations which share the common reference timing and transmit the pilot channels using an identical spread code and mutually different spread code phases, and the second type base stations which do not share the common reference timing and transmit the pilot channels using mutually different spread codes, so that it is possible to reduce a required number of spread codes for the pilot channels and thereby reduce the processing time required for the cell selection processing at the mobile station, compared with a case of using mutually different spread codes for all the base stations.

In addition, there is no need to increase the hardware size for the second type base station which is difficult to have a function to share the common reference timing, so that it is possible to construct the mobile communication system with a practically feasible base station configuration.

Moreover, in this first embodiment, the cell selection can be made properly even though the CDMA mobile communication system mixedly incorporates the base stations which share the common reference timing and transmit the pilot channels using an identical spread code and mutually different spread code phases, and the base stations which do not share the common reference timing and transmit the pilot channels using mutually different spread codes, because the mobile station can identify the individual pilot channel using both the spread code and the spread code phase.

Referring now to FIG. 9 and FIG. 10, the second embodiment of the cell selection scheme in the CDMA mobile communication system according to the present invention will be described in detail.

This second embodiment is a modification of the first embodiment described above, and the configurations of the base station and the mobile station are similar to those of the first embodiment.

In this second embodiment, a prescribed identical spread code to be used for the pilot channel at the first type base stations which share the common reference timing is specified in advance, and the memory 36 of every mobile station stores this prescribed identical spread code as well as mutually different spread codes that can be used by the second type base stations which do not share the common reference timing.

For the prescribed identical spread code, the mobile station operates similarly as in the first embodiment so that the memory 36 stores the receiving level and the spread code phase difference with respect to the mobile station reference timing, for all the peaks which exceed a prescribed threshold for example.

For the other pilot channel spread codes which are mutually different among different second type base stations, the memory 36 stores the receiving level and the spread code phase difference with respect to the mobile station reference timing only for a peak which has the largest receiving level among peaks appearing within one spread code period for each spread code, in correspondence to each spread code.

FIG. 9 shows exemplary despread signals outputted by the matched filter for a plurality of pilot channel spread codes in this second embodiment, where the spread code SD1 is the prescribed identical spread code while the spread codes SD2 and SD3 are other mutually different spread codes.

FIG. 10 shows an exemplary table stored in the memory 36 in this second embodiment in correspondence to the despread signals for three spread codes shown in FIG. 9, which indicates the spread code phase differences with respect to the mobile station reference timing and the receiving levels corresponding to each pilot channel spread code. Here, a spread code number appearing in the table of FIG. 10 is an identification number for identifying each spread code. In practice, the content stored in the memory can be given in terms of binary patterns representing the spread codes, or in terms of identification numbers for identifying the spread codes. In FIG. 10, the spread code numbers 1, 2 and 3 correspond to the spread codes SD1, SD2 and SD3 of FIG. 9. For the spread code SD1, the spread code phase differences and the receiving levels for all three peaks are stored in correspondence to the spread code number 1. For each of the spread codes SD2 and SD3, the spread code phase difference and the receiving level for only a peak with the largest receiving level among a plurality of peaks appearing in FIG. 9 are stored in correspondence to the spread code number 2 or 3.

Now, the effect of this second embodiment will be described. By the prescribed identical spread code, the first type base stations which share the common reference timing are transmitting the pilot channels at mutually different spread code phase differences with respect to the common reference timing, so that it is necessary for the mobile station to account for a plurality of receiving levels at a plurality of spread code phases in the cell selection.

In contrast, by the mutually different spread codes, only one second type base station is transmitting the pilot channel using one spread code, so that only one peak should appear in the despread signal in principle. However, additional peaks may appear when the noise component or the correlation with the other spread code is high. However, these additional peaks are not a peak of the actually transmitted pilot channel, so that there is no need to store information for these additional peaks in the memory from a viewpoint of the cell selection processing.

Moreover, a probability for the receiving level of the additional peak to be greater than that of the peak corresponding to the actually transmitted pilot channel is quite low, so that by storing information for only a peak with the largest receiving level, it becomes possible to effectively ignore the other peaks which are unnecessary for the cell selection, and consequently it becomes possible to reduce the required memory capacity. In addition, it also becomes possible to eliminate any wasteful checking of the validity of the communication for the peak which is not corresponding to the actually transmitted pilot channel, so that it becomes possible to reduce the processing load as well.

Next, the third embodiment of the cell selection scheme in the CDMA mobile communication system according to the present invention will be described in detail.

This third embodiment is a modification of the first embodiment described above, and the configurations of the base station and the mobile station are similar to those of the first embodiment.

In this third embodiment, the first type base stations which share the common reference timing have mutually different spread code phase differences, and these spread code phase differences are set by dividing one spread code period into equal parts. Namely, in a case of using N spread code phases for one spread code, the N spread code phase differences with respect to the common reference timing can be set as $0, X/N, 2X/N, 3X/N, \ldots, (N-1)X/N$ in this third embodiment.

Now, the effect of this third embodiment will be described. When the spread code phases are set non-uniformly, there can be a plurality of pilot channels for which a difference between the assigned spread code phases is small. Moreover, when a distance between the mobile station and the base station is different for each base station and the radio wave propagation delay time is different for each base station, a plurality of pilot channels with a small difference between the assigned spread code phases can be received by the mobile station at almost identical phase. When the mobile station receives a plurality of pilot channels at almost identical timing, the mobile station cannot receive these pilot channels separately, and it becomes impossible to receive these pilot channels without an error because of the mutual interference among them, so that it becomes impossible to select the cells corresponding to these pilot channels properly. In contrast, when the spread code phase are set uniformly as in this third embodiment, there is no two pilot channels for which a difference between the assigned spread code phases is small, so that the above noted problem can be avoided.

Figure 11B:
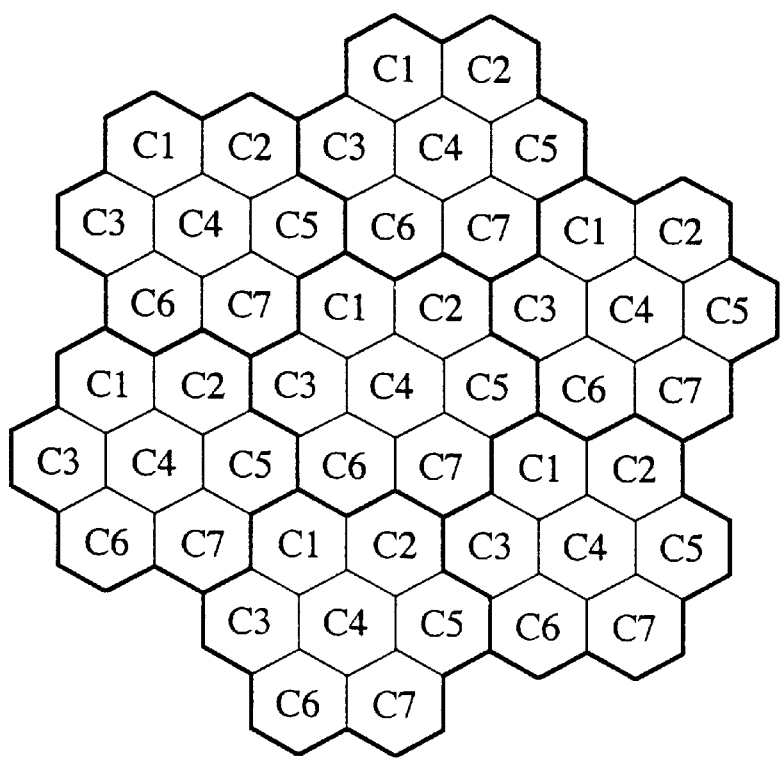
FIG. 11B is an illustration of an exemplary overall arrangement pattern for the pilot channel spread code phase differences according to the fourth embodiment of the present invention.
Figure 11A:
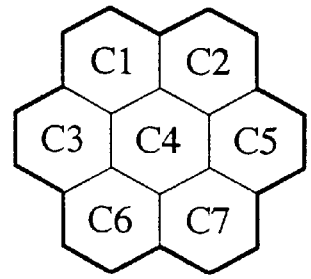
FIG. 11A is an illustration of an exemplary basic arrangement pattern for the pilot channel spread code phase differences according to the fourth embodiment of the present invention.

Referring now to FIG. 11A and FIG. 11B, the fourth embodiment of the cell selection scheme in the CDMA mobile communication system according to the present invention will be described in detail.

This fourth embodiment is a modification of the first embodiment described above, and the configurations of the base station and the mobile station are similar to those of the first embodiment.

In this fourth embodiment, in a case of using N mutually different spread code phase differences with respect to the common reference timing for the first type base stations, these N spread code phase differences are assigned to N first type base stations which are located within a geographically connected region, and this arrangement of the N spread code phase differences is used as a basic arrangement pattern so that the spread code phase differences are arranged over all the first type base stations by repeating the basic arrangement pattern geographically.

FIG. 11A shows an exemplary basic arrangement pattern for seven spread code phase differences C1 to C7 over seven cells which are located within a hexagonal region. FIG. 11B shows an exemplary overall arrangement pattern for these seven spread code phase differences C1 to C7 which is obtained by repeating the basic arrangement pattern of FIG. 11A two-dimensionally.

In this manner, the base stations which use the same spread code phase difference are arranged to be separated by the equal distance from each other, so that no two base stations located within a shorter distance will use the same spread code phase difference, and therefore it becomes possible to eliminate the undesirable case where a plurality of pilot channels using the same spread code phase difference interfere with each other at a time of receiving by the mobile station and erroneously received by the mobile station.

Furthermore, for M mutually different spread codes to be used by the second type base stations which do not share the common reference timing, the similar arrangement can be adopted so that these M spread codes are assigned to M second type base stations which are located within a geographically connected region, and this arrangement of the M spread codes is used as a basic arrangement pattern so that the spread codes arranged over all the second type base stations by repeating the basic arrangement pattern geographically. In this manner, it becomes possible to eliminate the undesirable case where a plurality of pilot channels using the same spread code interfere with each other at a time of receiving by the mobile station and erroneously received by the mobile station.

Referring now to FIG. 12 to FIG. 15, the fifth embodiment of the cell selection scheme in the CDMA mobile communication system according to the present invention will be described in detail.

Figure 4:
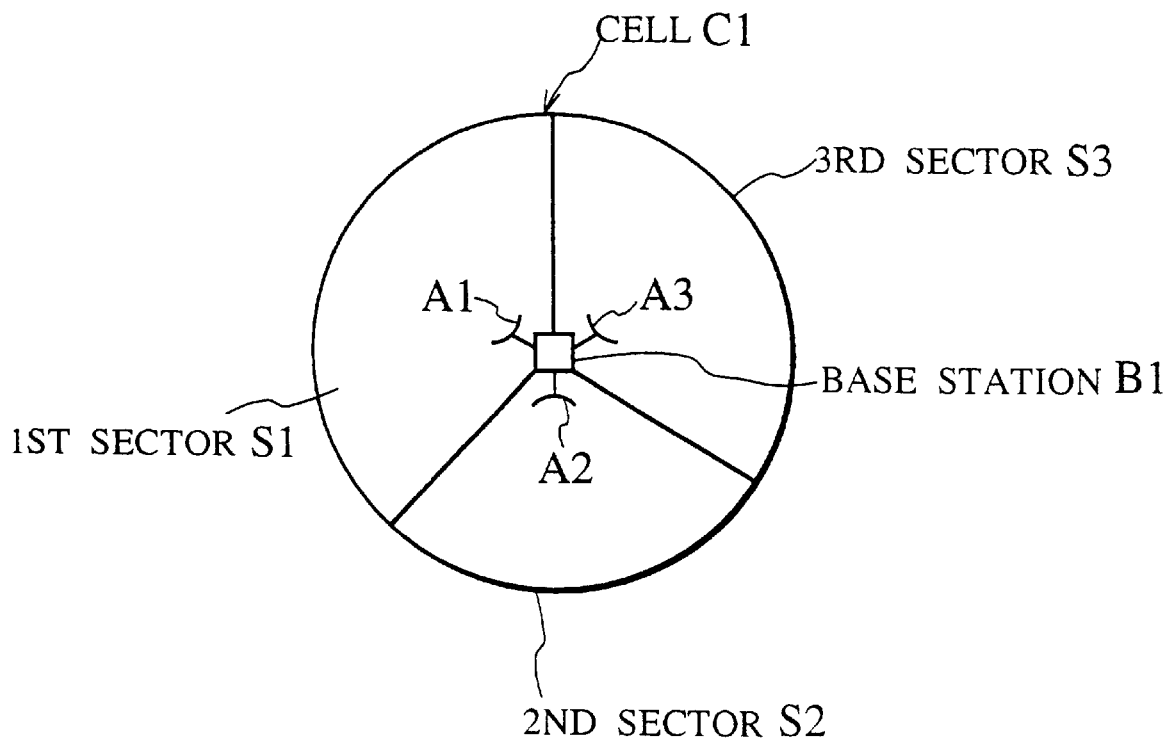
FIG. 4 is an illustration of sectors subdividing a cell used in a CDMA mobile communication system.

This fifth embodiment is directed to a case of using a plurality of sectors subdividing one cell, where the feature concerning a use of an identical spread code and mutually different spread code phases among the first type base stations in the above described embodiments is extended to a use of an identical spread code and mutually different spread code phases among the sectors of the same cell. In the following, an exemplary case in which one cell is subdivided into three sectors S1, S2 and S3 as shown in FIG. 4 will be described.

In the mobile communication system, in order to make a located cell judgement, mutually different pilot channel spread codes are assigned to cells and a base station of each cell is constantly transmitting the pilot channel spread by the assigned pilot channel spread code. Similarly, when a cell is subdivided into sectors, in order to make a located sector judgement, it is necessary to assign pilot channels to sectors.

In this fifth embodiment, in a case of using sectors, for pilot channels to be assigned to sectors, an identical spread code and mutually different spread code phases are assigned to a plurality of sectors within the same cell, instead of assigning mutually different spread codes to different sectors, so as to enable the located sector judgement according to a combination of the spread code and the spread code phase. According to this fifth embodiment, even for those cells to which mutually different pilot channel spread codes are assigned, the pilot channel spread code assigned to such a cell is commonly used for all the sectors subdividing such a cell while mutually different spread code phases are assigned to these sectors.

FIG. 12 shows exemplary spread code and spread code phases to be used in spreading the pilot channels of three sectors S1, S2 and S3. As shown in FIG. 12, the base station generates a reference timing signal to be used as a reference for defining mutually different spread code phases to the sectors, and the base station transmits the pilot channels spread by the same spread code at these mutually different spread code phases for the sectors S1, S2 and S3. Here, the base station generates the reference timing signal in the spread code period as indicated in a part (a) of FIG. 12.

Three sectors S1, S2 and S3 constitute the same cell, so that the identical spread code is assigned to all these sectors, but for the sector S1, the pilot channel is spread by this spread code at the spread code phase equal to 0 with respect to the reference timing signal, that is, in synchronization with the reference timing signal, as indicated in a part (b) of FIG. 12. Also, for the sector S2, the pilot channel is spread by the same spread code at the spread code phase equal to P with respect to the reference timing signal as indicated in a part (c) of FIG. 12, so that there is a spread code phase difference of P between the sector S1 and the sector S2. Also, for the sector S3, the pilot channel is spread by the same spread code at the spread code phase equal to 2P with respect to the reference timing signal as indicated in a part (d) of FIG. 12, so that there is a spread code phase difference of P between the sector S2 and the sector S3.

When the pilot channels are transmitted from the base station to each mobile station using the identical spread code and mutually different spread code phases for the pilot channels of the sectors within the same cell in this manner, the mobile station which received these pilot channels can judge the located cell from the spread code with the largest peak output level, and the located sector from the peak output timing for that spread code.

FIG. 13 shows an exemplary output of the matched filter in the mobile station when the pilot channels spread by the spread code of the located cell at mutually different spread code phases are received by the mobile station. FIG. 13 shows an output level of the matched filter in the mobile station an exemplary case in which one cell is subdivided into three sectors and the equal spread code phase differences are used among these three sectors, so that there are three peak signals which are higher than the rest at positions corresponding to the assigned spread code phases within one spread code period. These three peak signals correspond to the sectors to which mutually different spread code phases are assigned, and the peak value K1 corresponding to a sector at which the mobile station is currently located appears largest, while the peak value K2 corresponding to another sector near the currently located sector appears smaller than the peak value K1 and the peak value K3 corresponding to still another sector far from the currently located sector appears even smaller than the peak value K2.

Consequently, the mobile station can judge the located sector by detecting the largest peak value among these peak values. Subsequently, by receiving the pilot channel at the timing of the largest peak value, the mobile station can be set in a standby state at the located sector.

Note here that the pilot channel with the largest output level among the pilot channels for all the sectors within the same cell can be detected within one spread code period. Consequently, regardless of a number of sectors, it is possible to determine the pilot channel with the largest receiving level among the pilot channels for all the sectors of the cell within the same period of time by which the receiving level of the pilot channel for one sector has been measured conventionally. Consequently, even when a number of sectors is increased, it is possible to make the activation time of the mobile station constant.

FIG. 14 shows a configuration of a cell/sector selection related section of a base station device in the CDMA mobile communication system according to the fifth embodiment. This base station device 3 of FIG. 14 is for an exemplary case in which one cell is subdivided into three sectors S1, S2 and S3, and has three directional antennas A1, A2 and A3 for transmitting the pilot channels toward these three sectors S1, S2 and S3, respectively. These antennas A1, A2 and A3 are connected with respective transmission units 41, 42 and 43, which are connected with a control unit 45.

The transmission unit 41 has an amplifier 411, a spread modulation unit 412 and an encoding unit 413, and the other transmission units 42 and 43 has a similar internal configuration as the transmission unit 41 although not depicted in FIG. 14.

The control unit 25 has an input/output (I/O) interface 451, a CPU 452, a memory 453 and a reference clock generator 454.

The antennas A1, A2 and A3 transmit the pilot channels spread by the identical spread code at mutually different spread code phases toward the sectors S1, S2 and S3, respectively, so that the antenna A1 transmits the pilot channel spread at the spread code phase 0 as indicated in a part (b) of FIG. 12, the antenna A2 transmits the pilot channel spread at the spread code phase P as indicated in a part (c) of FIG. 12, and the antenna A3 transmits the pilot channel spread at the spread code phase 2P as indicated in a part (d) of FIG. 12.

The memory 453 stores information necessary in generating these pilot channels to be transmitted from the antennas A1, A2 and A3, including the spread code, the spread code phases assigned to the sectors, a number of sectors, a chip number per one symbol, etc. In this fifth embodiment, as the spread code phase information for each sector, the spread code phase=0 for the sector S1, the spread code phase=P for the sector S2, and the spread code phase=2P for the sector S3 are stored in the memory 453.

The reference clock generator 454 generates the reference timing signal as indicated in a part (a) of FIG. 12.

The spread modulation unit 412 of each transmission unit is supplied with the pilot channel spread code and the spread code phase information for the corresponding sector from the memory 453 as well as the reference timing signal from the reference clock generator 454 under the control of the CPU 452 of the control unit 45, and displaces the pilot channel spread by the supplied spread code with respect to the reference timing signal by the spread code phase assigned to the corresponding sector. This pilot channel is then amplified by the amplifier 411 and transmitted from the corresponding antenna.

In further detail, the spread modulation unit 412 of the transmission unit 41 generates the pilot channel spread by the supplied spread code at the spread code phase 0 with respect to the reference timing signal as indicated in a part (b) of FIG. 12, and this pilot channel is amplified by the amplifier 411 and transmitted from the antenna A1 toward the sector S1. Similarly, the spread modulation unit of the transmission unit 42 generates the pilot channel spread by the supplied spread code at the spread code phase P with respect to the reference timing signal as indicated in a part (c) of FIG. 12, and this pilot channel is amplified by the amplifier and transmitted from the antenna A2 toward the sector S2. Similarly, the spread modulation unit of the transmission unit 43 generates the pilot channel spread by the supplied spread code at the spread code phase 2P with respect to the reference timing signal as indicated in a part (d) of FIG. 12, and this pilot channel is amplified by the amplifier and transmitted from the antenna A3 toward the sector S3.

Note that, in the above description, the spread code phases of the pilot channel spread code are displaced one another by an equal value P which is appropriately set in accordance with a number of sectors as indicated in parts (b) to (d) of FIG. 12, but the spread code phases may be displaced in any desired manner instead. It should be noted however that, by using the equal spread code phase differences among the sectors which are obtained by dividing the spread code length into equal parts, it is possible to reduce an amount of information to be stored in the memory 453.

Namely, when the pilot channel spread code has a length of X chips and a number of sectors within one cell is Y, the spread code phase differences to be assigned to the sectors can be set as 0, X/Y, 2X/Y, 3X/Y, . . . , (Y–1)X/Y so that the spread code phases assigned to the sectors are uniformly displaced one another by X/Y. For example, when one symbol constituting the spread code is given by 64 chips, and a number of sectors is 4, the spread code phase difference of 64/4=16 chips can be used uniformly among the sectors.

Figure 15:
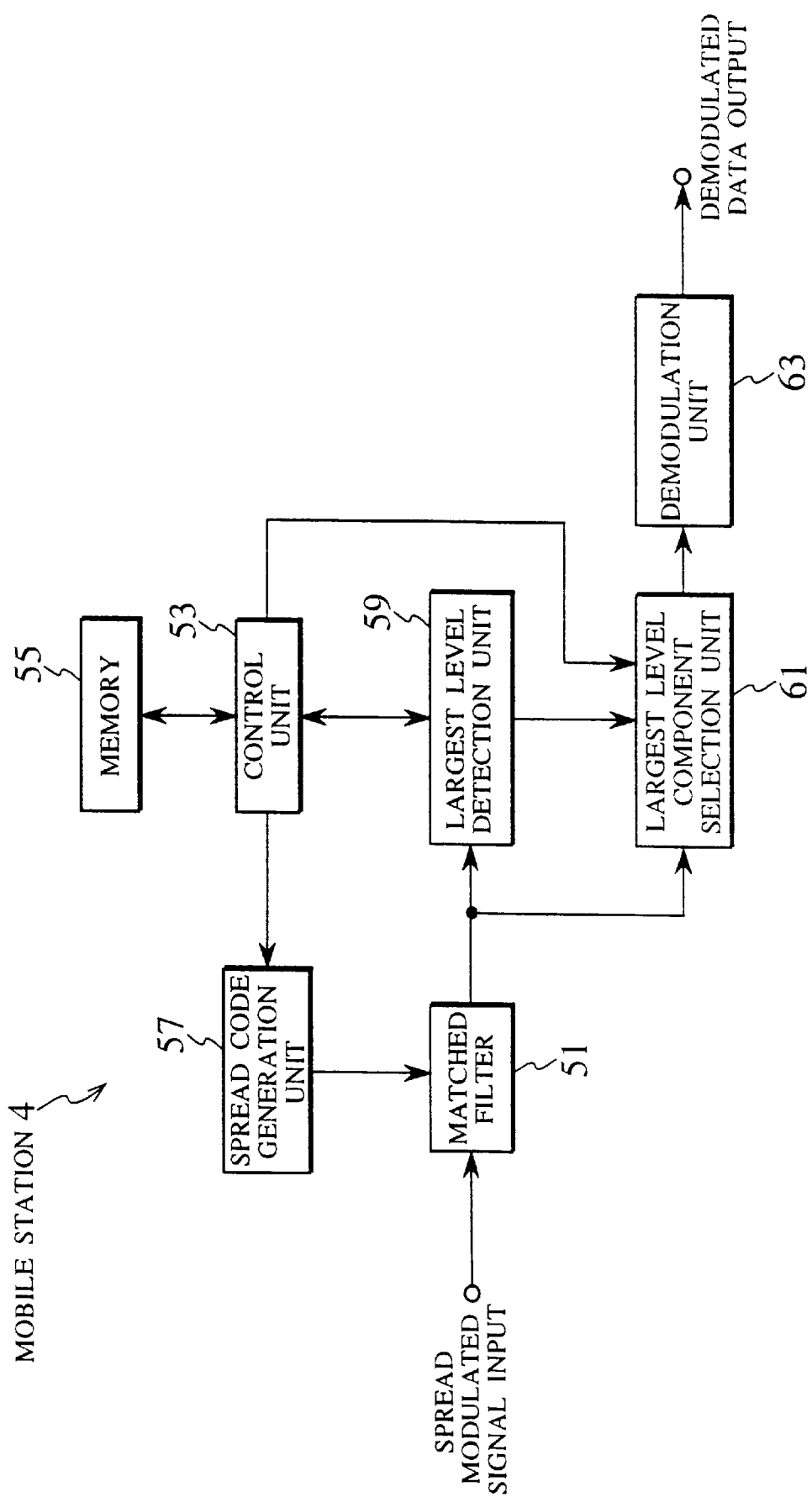
FIG. 15 is a block diagram of a cell/sector selection related section of a mobile station according to the first embodiment of the present invention.

FIG. 15 shows a configuration of a cell/sector selection related section of a mobile station device in the CDMA mobile communication system according to the fifth embodiment. This mobile station device 4 of FIG. 15 comprises a matched filter 51, a largest level detection unit 59 connected with the matched filter 51, a largest level component selection unit 61 connected with the matched filter 51 and the largest level detection unit 59, a demodulation unit 63 connected with the largest level component selection unit 61, a spread code generation unit 57 connected with the matched filter 51, a control unit 53 connected with the spread code generation unit 57, the largest level detection unit 59 and the largest level component extraction unit 61, and a memory 55 connected with the control unit 53.

The matched filter 51 despreads the spread modulated signal received from the base station by the spread code of the mobile station and outputs the despread signal, and the spread code generation unit 57 supplies the spread code of the mobile station to the matched filter 51.

The largest level detection unit 59 detects the largest level and a timing within one spread code period of the largest level from the despread signal outputted by the matched filter 51.

The largest level component selection unit 61 selects the largest level signal component from the despread signal outputted by the matched filter 51, and the demodulation unit 63 demodulates the largest level signal component selected by the largest level component selection unit 61.

The memory 55 stores a plurality of spread code identification numbers for the pilot channel spread codes, and the control unit 53 controls the overall operation of the mobile station while supplying the pilot channel spread code identification numbers read out from the memory 55 to the spread code generation unit 57.

This mobile station in a configuration of FIG. 15 operates as follows.

At a time of activation after the power is turned on, the mobile station receives the spread modulated signal which is transmitted from the base station as the pilot channel, and inputs this spread modulated signal into the matched filter 51. On the other hand, the control unit 53 reads out one pilot channel spread code identification number from the memory 55 and supplies the read out pilot channel spread code identification number to the spread code generation unit 57. The spread code generation unit 57 then generates the spread code corresponding to the spread code identification number supplied from the control unit 53, and supplies the generated spread code to the matched filter 51.

The matched filter 51 despreads the spread modulated signal by the spread code supplied from the spread code generation unit 57, and supplies the despread signal to the largest level detection unit 59.

The largest level detection unit 59 measures the largest level of the despread signal within one spread code period and a timing of the largest level within one spread code period, and supplies the largest level and its timing for each spread code to the control unit 53.

This processing is repeated until the control unit 53 receives the largest level and its timing from the largest level detection unit 59 for all the pilot channel spread codes stored in the memory 55. Then, the control unit 53 selects the spread code for which the largest level is largest among all the pilot channel spread codes, and judges that the mobile station is located in a cell which is transmitting the pilot channel spread by this selected spread code.

The control unit 53 then notifies the spread code identification number of the selected spread code to the spread code generation unit 57, so that the spread code generation unit 57 supplies the selected spread code to the matched filter 51. The matched filter 51 despreads the spread modulation signal by the selected spread code supplied from the spread code generation unit 57, and outputs the despread signal.

The largest level detection unit 59 then measures the largest level and its timing within one spread code period for the selected spread code from the despread signal outputted by the matched filter 51, and notifies the measurement result to the control unit 53. The control unit 53 then supplies the notified largest level timing to the largest level component selection unit 61.

The largest level component selection unit 61 selects only the largest level signal component in the despread signal according to the despread signal supplied from the matched filter 51 and the timing signal supplied from the control unit 53, and supplies the selected largest level signal component to the demodulation unit 63. The demodulation unit 63 demodulates the supplied largest level signal component and outputs the demodulated data.

As described, according to this fifth embodiment, the identical pilot channel spread code and mutually different spread code phases are assigned to a plurality of sectors subdividing the same cell, so that there is no need to increase a number of pilot channel spread codes and it is possible to judge the sector for which the pilot channel receiving level is largest among the sectors of the cell within one spread code period. Consequently, even when a number of sectors is increased, it is possible to make the activation time of the mobile station constant.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for judging a located cell of a mobile station in a CDMA mobile communication system in which a base station is provided at each of a plurality of cells, comprising the steps of:

transmitting from a plurality of first type base stations which share a common reference timing, pilot channels spread by using an identical pilot channel spread code at mutually different spread code phases with respect to the common reference timing, said mutually different spread code phases being assigned to different first type base stations;

transmitting from a plurality of second type base stations which do not share the common reference timing, pilot channels spread by using mutually different pilot channel spread codes at arbitrary spread code phases, said mutually different pilot channel spread codes being assigned to different second type base stations; and receiving the pilot channels transmitted from the first and second type base stations at a mobile station, and judging a located cell of the mobile station according to receiving levels, pilot channel spread codes and spread code phases of received pilot channels.

2. The method of claim 1, wherein the mobile station judges the located cell by the steps of:

sequentially despreading a received signal of the mobile station by each one of a plurality of spread codes that can be used for spreading the pilot channels, measuring receiving levels for a plurality of spread codes and spread code phases, and storing each measured receiving level in a memory in correspondence to corresponding spread code and spread code phase;

carrying out despreading and receiving processing for one pilot channel corresponding to a spread code and a spread code phase for which the measured receiving level is largest among the measured receiving levels stored in the memory; and judging a validity of a communication at one cell supported by a base station which is transmitting said one pilot channel, and judging said one cell as the located cell when the communication at said one cell is judged as valid.

3. The method of claim 2, wherein when the communication at said one cell is judged as not valid, until some cell is judged as the located cell, the mobile station repeats the steps of:

carrying out despreading and receiving processing for another pilot channel corresponding to a spread code and a spread code phase for which the measured receiving level is next largest among the measured receiving levels stored in the memory; and judging a validity of a communication at another cell supported by a base station which is transmitting said another pilot channel, and judging said another cell as the located cell when the communication at said another cell is judged as valid.

4. The method of claim 2, wherein the mobile station measures and stores the receiving levels at a plurality of spread code phases for said identical pilot channel spread code, and measures and stores the receiving level at one spread code phase at which the receiving level is largest within one spread code period for each one of said mutually different pilot channel spread codes.

5. The method of claim 1, wherein said mutually different spread code phases are set to have spread code phase differences with respect to the common reference timing equal to 0, X/N, 2X/N, 3X/N, . . . , (N−1)X/N, where X is a number of chips for a spread code length and N is a number of said mutually different spread code phases.

6. The method of claim 1, wherein when a total number of said mutually different spread code phases is N, a basic spread code phase arrangement pattern is formed by assigning said mutually different spread code phases to N first type base stations which are positioned in a geographically connected region, and an overall spread code phase arrangement pattern is formed by geographically repeating the basic spread code phase arrangement pattern over all the first type base stations.

7. The method of claim 1, wherein when a total number of said mutually different spread codes is N, a basic spread code arrangement pattern is formed by assigning said mutually different spread codes to N second type base stations which are positioned in a geographically connected region, and an overall spread code arrangement pattern is formed by geographically repeating the basic spread code arrangement pattern over all the second type base stations.

8. The method of claim 1, wherein the CDMA mobile communication system includes at least one cell which is subdivided into a plurality of sectors, and the method further comprising the steps of:
   transmitting from one base station provided at said at least one cell, pilot channels for sectors spread by using a pilot channel spread code assigned to said one base station with mutually different spread code phase differences with respect to a reference timing of said one base station, said mutually different spread code phase differences being assigned to different sectors; and
   receiving the pilot channels transmitted from said one base station at the mobile station, and judging a located cell/sector of the mobile station according to receiving levels, pilot channel spread codes and spread code phases of received pilot channels.

9. The method of claim 8, wherein said mutually different spread code phase differences are set to be 0, X/Y, 2X/Y, 3X/Y, . . . , (Y−1)X/Y with respect to the reference timing, where X is a number of chips for a spread code length and Y is a number of said plurality of sectors.

10. A CDMA mobile communication system in which a base station is provided at each of a plurality of cells, comprising:
   a plurality of first type base stations which share a common reference timing, for transmitting pilot channels spread by using an identical pilot channel spread code at mutually different spread code phases with respect to the common reference timing, said mutually different spread code phases being assigned to different first type base stations;
   a plurality of second type base stations which do not share the common reference timing, for transmitting pilot channels spread by using mutually different pilot channel spread codes at arbitrary spread code phases, said mutually different pilot channel spread codes being assigned to different second type base stations; and
   a mobile station for receiving the pilot channels transmitted from the first and second type base stations, and judging a located cell of the mobile station according to receiving levels, pilot channel spread codes and spread code phases of received pilot channels.

11. The system of claim 10, wherein the mobile station includes:
   a measurement device for sequentially despreading a received signal of the mobile station by each one of a plurality of spread codes that can be used for spreading the pilot channels, and measuring receiving, levels for a plurality of spread codes and spread code phases;
   a memory for storing each measured receiving level obtained by the measurement device in correspondence to corresponding spread code and spread code phase;
   a judgement device for carrying out despreading and receiving processing for one pilot channel corresponding to a spread code and a spread code phase for which the measured receiving level is largest among the measured receiving levels stored in the memory, judging a validity of a communication at one cell supported by a base station which is transmitting said one pilot channel, and judging said one cell as the located cell when the communication at said one cell is judged as valid.

12. The system of claim 11, wherein when the communication at said one cell is judged, as not valid, until some cell is judged as the located cell, the judgement device repeats a despreading and receiving processing for another pilot channel corresponding to a spread code and a spread code phase for which the measured receiving level is next largest among the measured receiving levels stored in the memory, and a judgement processing for judging a validity of a communication at another cell supported by a base station which is transmitting said another pilot channel, and judging said another cell as the located cell when the communication at said another cell is judged as valid.

13. The system of claim 11, wherein the measurement device measures the receiving levels at a plurality of spread code phases for said identical pilot channel spread code, and measures the receiving level at one spread code phase at which the receiving level is largest within one spread code period for each one of said mutually different pilot channel spread codes.

14. The system of claim 10, wherein among the first type base stations said mutually different spread code phases are set to have spread code phase differences with respect to the common reference timing equal to 0, X/N, 2X/N, 3X/N, . . . , (N−1)X/N, where X is a number of chips for a spread code length and N is a number of said mutually different spread code phases.

15. The system of claim 10, wherein among the first type base stations, when a total number of said mutually different spread code phases is N, a basic spread code phase arrangement pattern is formed by assigning said mutually different spread code phases to N first type base stations which are positioned in a geographically connected region, and an overall spread code phase arrangement pattern is formed by geographically repeating the basic spread code phase arrangement pattern over all the first type base stations.

16. The system of claim 10, wherein among the second type base stations, when a total number of said mutually different spread codes is N, a basic spread code arrangement pattern is formed by assigning said mutually different spread codes to N second type base stations which are positioned in a geographically connected region, and an overall spread code arrangement pattern is formed by geographically repeating the basic spread code arrangement pattern over all the second type base stations.

17. The system of claim 10, wherein at least one cell is subdivided into a plurality of sectors, and the system includes:

one base station provided at said at least one cell, for transmitting pilot channels for the sectors spread by using a pilot channel spread code assigned to said one base station with mutually different spread code phase differences with respect to a reference timing of said one base station, said mutually different spread code phase differences being assigned to different sectors;

wherein the mobile station receives the pilot channels transmitted from said one base station, and judges a located cell/sector of the mobile station according to receiving levels, pilot channel spread codes and spread code phases of received pilot channels.

18. The system of claim 17, wherein among said plurality of sectors said mutually different spread code phase differences are set to be 0, X/Y, 2X/Y, 3X/Y, ..., (Y−1)X/Y with respect to the reference timing, where X is a number of chips for a spread code length and Y is a number of said plurality of sectors.

19. A mobile station apparatus for use in a CDMA mobile communication system in which a base station is provided at each of a plurality of cells, the base stations includes a plurality of first type base stations and a plurality of second type base stations, the first type base stations being sharing a common reference timing and transmitting pilot channels spread by using an identical pilot channel spread code at mutually different spread code phases with respect to the common reference timing where said mutually different spread code phases are assigned to different first type base stations, the second type base stations being not sharing the common reference timing and transmitting pilot channels spread by using mutually different pilot channel spread codes at arbitrary spread code phases where said mutually different pilot channel spread codes are assigned to different second type base stations, and a located cell of a mobile station is judged according to a pilot channel transmitted by each base station, the mobile station apparatus comprising:

a receiving device for receiving pilot channels transmitted from the first and second type base stations; and a judgement device for judging a located cell of the mobile station according to receiving levels, pilot channel spread codes and spread code phases of received pilot channels.

20. The apparatus of claim 19, wherein the judgement device includes:

a measurement unit for sequentially despreading a received signal of the mobile station by each one of a plurality of spread codes that can be used for spreading the pilot channels, and measuring receiving levels for a plurality of spread codes and spread code phases;

a memory for storing each measured receiving level obtained by the measurement unit in correspondence to corresponding spread code and spread code phase;

a judgement unit for carrying out despreading and receiving processing for one pilot channel corresponding to a spread code and a spread code phase for which the measured receiving level is largest among the measured receiving levels stored in the memory, judging a validity of a communication at one cell supported by a base station which is transmitting said one pilot channel, and judging said one cell as the located cell when the communication at said one cell is judged as valid.

21. The apparatus of claim 20, wherein when the communication at said one cell is judged as not valid, until some cell is judged as the located cell, the judgement unit repeats a despreading and receiving processing for another pilot channel corresponding to a spread code and a spread code phase for which the measured receiving level is next largest among the measured receiving levels stored in the memory, and a judgement processing for judging a validity of a communication at another cell supported by a base station which is transmitting said another pilot channel, and judging said another cell as the located cell when the communication at said another cell is judged as valid.

22. The apparatus of claim 20, wherein the measurement unit measures the receiving levels at a plurality of spread code phases for said identical pilot channel spread code, and measures the receiving level at one spread code phase at which the receiving level is largest within one spread code period for each one of said mutually different pilot channel spread codes.

23. A base station apparatus for use as a base station provided in one cell which is subdivided into a plurality of sectors in a CDMA mobile communication system in which a base station is provided at each of a plurality of cells, base stations provided at different cells are assigned mutually different pilot channel spread codes, and a located cell/sector of a mobile station is judged according to a pilot channel transmitted by each base station, the base station apparatus comprising:

a timing device for generating a reference timing; and a transmission device for transmitting pilot channels for the sectors spread by using one pilot channel spread code assigned to the base station apparatus at mutually different spread code phase differences with respect to the reference timing, said mutually different spread code phase differences being assigned to different sectors, such that the mobile station can identify said one cell according to said one pilot channel spread code used in spreading the pilot channels for the sectors.

24. A mobile station apparatus for use in a CDMA mobile communication system in which a base station is provided at each of a plurality of cells, base stations provided at different cells are assigned mutually different pilot channel spread codes, a located cell/sector of a mobile station is judged according to a pilot channel transmitted by each base station, at least one cell is subdivided into a plurality of sectors, and one base station provided at said at least one cell is transmitting pilot channels for the sectors spread by using one pilot channel spread code assigned to said one base station with mutually different spread code phase differences with respect to a reference timing, said mutually different spread code phase differences being assigned to different sectors, the mobile station apparatus comprising:

a receiving device for receiving pilot channels transmitted from base stations including the pilot channels for the sectors transmitted from said one base station; and a judgement device for judging a located cell of the mobile station according to receiving levels and pilot channel spread codes of received pilot channels, and judging a located sector of the mobile station according to receiving levels and spread code phases of received pilot channels for the sectors.

* * * * *